United States Patent
Tripathi et al.

(10) Patent No.: US 7,941,539 B2
(45) Date of Patent: May 10, 2011

(54) METHOD AND SYSTEM FOR CREATING A VIRTUAL ROUTER IN A BLADE CHASSIS TO MAINTAIN CONNECTIVITY

(75) Inventors: Sunay Tripathi, San Jose, CA (US); Nicolas G. Droux, Rio Rancho, NM (US)

(73) Assignee: Oracle America, Inc., Redwood City, CA (US)

(*) Notice: Subject to any disclaimer, the term of this patent is extended or adjusted under 35 U.S.C. 154(b) by 401 days.

(21) Appl. No.: 12/165,275

(22) Filed: Jun. 30, 2008

(65) Prior Publication Data

US 2009/0327392 A1    Dec. 31, 2009

(51) Int. Cl.
*G06F 15/173* (2006.01)

(52) U.S. Cl. ........ 709/226; 709/203; 709/213; 709/215; 709/227

(58) Field of Classification Search .................... 709/226
See application file for complete search history.

(56) References Cited

U.S. PATENT DOCUMENTS

| | | | |
|---|---|---|---|
| 6,041,053 A | 3/2000 | Douceur et al. |
| 6,070,219 A | 5/2000 | McAlpine et al. |
| 6,131,163 A | 10/2000 | Wiegel |
| 6,163,539 A | 12/2000 | Alexander et al. |
| 6,269,401 B1 | 7/2001 | Fletcher et al. |
| 6,477,643 B1 | 11/2002 | Vorbach et al. |
| 6,594,775 B1 | 7/2003 | Fair |
| 6,600,721 B2 | 7/2003 | Edholm |
| 6,714,960 B1 | 3/2004 | Bitar et al. |
| 6,757,731 B1 | 6/2004 | Barnes et al. |
| 6,771,595 B1 | 8/2004 | Gilbert et al. |
| 6,831,893 B1 | 12/2004 | Ben Nun et al. |
| 6,859,841 B2 | 2/2005 | Narad et al. |
| 6,944,168 B2 | 9/2005 | Paatela et al. |
| 6,985,937 B1 | 1/2006 | Keshav et al. |
| 7,046,665 B1 | 5/2006 | Walrand et al. |

(Continued)

FOREIGN PATENT DOCUMENTS

WO    2005057318 A2    6/2005

(Continued)

OTHER PUBLICATIONS

Gunjan Khanna, Application performance management in virtualized server environment, 2006, Purdue University, pp. 9.*

(Continued)

*Primary Examiner* — Kevin Bates
*Assistant Examiner* — Arvin Eskandarnia
(74) *Attorney, Agent, or Firm* — Osha • Liang LLP

(57) ABSTRACT

A method for migrating a first virtual machine (VM), that includes transmitting, prior to migration, a first packet between the first VM on a first blade chassis and a second VM on a second blade chassis using a first virtual network interface card (VNIC) and a second VNIC. The method includes migrating the first VM and the first VNIC to the second blade, identifying a subnet of the first VM, identifying a subnet of the second VM, and creating a virtual router to execute on the second blade. The virtual router is associated with a third VNIC and a fourth VNIC. A first network address in the first VNIC's subnet is assigned to the third VNIC. A second network address in the second VNIC's subnet is assigned to the fourth VNIC. The method includes routing a second packet between the first VM and the second VM using the virtual router.

20 Claims, 11 Drawing Sheets

U.S. PATENT DOCUMENTS

| | | | |
|---|---|---|---|
| 7,111,303 B2 | 9/2006 | Macchiano et al. | |
| 7,146,431 B2 | 12/2006 | Hipp et al. | |
| 7,177,311 B1 | 2/2007 | Hussain et al. | |
| 7,200,704 B2 | 4/2007 | Njoku et al. | |
| 7,260,102 B2 | 8/2007 | Mehrvar et al. | |
| 7,313,142 B2 | 12/2007 | Matsuo et al. | |
| 7,450,498 B2 | 11/2008 | Golia et al. | |
| 7,502,884 B1 | 3/2009 | Shah et al. | |
| 7,561,531 B2 | 7/2009 | Lewites et al. | |
| 7,620,955 B1 | 11/2009 | Nelson | |
| 7,633,955 B1 | 12/2009 | Saraiya et al. | |
| 7,688,838 B1 | 3/2010 | Aloni et al. | |
| 7,694,298 B2 | 4/2010 | Goud et al. | |
| 7,730,486 B2 | 6/2010 | Herington | |
| 7,761,573 B2 * | 7/2010 | Travostino et al. | 709/226 |
| 7,788,411 B2 * | 8/2010 | Belgaied et al. | 709/250 |
| 2002/0052972 A1 | 5/2002 | Yim | |
| 2002/0080721 A1 | 6/2002 | Tobagi et al. | |
| 2003/0037154 A1 | 2/2003 | Poggio et al. | |
| 2003/0120772 A1 | 6/2003 | Husain et al. | |
| 2004/0015966 A1 | 1/2004 | MacChiano et al. | |
| 2004/0170127 A1 | 9/2004 | Tanaka | |
| 2004/0199808 A1 | 10/2004 | Freimuth et al. | |
| 2004/0202182 A1 | 10/2004 | Lund et al. | |
| 2004/0210623 A1 | 10/2004 | Hydrie et al. | |
| 2004/0267866 A1 | 12/2004 | Carollo et al. | |
| 2005/0111455 A1 | 5/2005 | Nozue et al. | |
| 2005/0135243 A1 | 6/2005 | Lee et al. | |
| 2005/0138620 A1 | 6/2005 | Lewites | |
| 2005/0182853 A1 | 8/2005 | Lewites et al. | |
| 2005/0251802 A1 | 11/2005 | Bozek et al. | |
| 2006/0041667 A1 | 2/2006 | Ahn et al. | |
| 2006/0045089 A1 | 3/2006 | Bacher et al. | |
| 2006/0070066 A1 | 3/2006 | Grobman | |
| 2006/0092928 A1 | 5/2006 | Pike et al. | |
| 2006/0174324 A1 | 8/2006 | Zur et al. | |
| 2006/0206300 A1 * | 9/2006 | Garg et al. | 703/27 |
| 2006/0206602 A1 | 9/2006 | Hunter et al. | |
| 2006/0233168 A1 | 10/2006 | Lewites et al. | |
| 2006/0236063 A1 | 10/2006 | Hausauer et al. | |
| 2006/0253619 A1 | 11/2006 | Torudbakken et al. | |
| 2007/0047536 A1 | 3/2007 | Scherer et al. | |
| 2007/0078988 A1 | 4/2007 | Miloushev et al. | |
| 2007/0083723 A1 | 4/2007 | Dey et al. | |
| 2007/0101323 A1 | 5/2007 | Foley et al. | |
| 2007/0198656 A1 * | 8/2007 | Mazzaferri et al. | 709/218 |
| 2007/0244937 A1 | 10/2007 | Flynn et al. | |
| 2007/0244972 A1 | 10/2007 | Fan | |
| 2008/0002683 A1 | 1/2008 | Droux et al. | |
| 2008/0005748 A1 | 1/2008 | Mathew et al. | |
| 2008/0019365 A1 | 1/2008 | Tripathi et al. | |
| 2008/0022016 A1 | 1/2008 | Tripathi et al. | |
| 2008/0043765 A1 | 2/2008 | Belgaied et al. | |
| 2008/0144635 A1 | 6/2008 | Carollo et al. | |
| 2008/0163207 A1 * | 7/2008 | Reumann et al. | 718/1 |
| 2008/0171550 A1 | 7/2008 | Zhao | |
| 2008/0192648 A1 | 8/2008 | Galles | |
| 2008/0225875 A1 | 9/2008 | Wray et al. | |
| 2008/0239945 A1 | 10/2008 | Gregg | |
| 2008/0253379 A1 | 10/2008 | Sasagawa | |
| 2008/0270564 A1 * | 10/2008 | Rangegowda et al. | 709/212 |
| 2008/0270599 A1 | 10/2008 | Tamir et al. | |
| 2009/0006593 A1 | 1/2009 | Cortes | |
| 2009/0125752 A1 | 5/2009 | Chan et al. | |
| 2009/0172125 A1 * | 7/2009 | Shekhar et al. | 709/215 |
| 2009/0199177 A1 * | 8/2009 | Edwards et al. | 718/1 |
| 2009/0240790 A1 * | 9/2009 | Utsunomiya et al. | 709/221 |
| 2009/0300605 A1 * | 12/2009 | Edwards et al. | 718/1 |
| 2010/0046531 A1 | 2/2010 | Louati et al. | |
| 2010/0131636 A1 * | 5/2010 | Suri et al. | 709/224 |
| 2010/0153514 A1 * | 6/2010 | Dabagh et al. | 709/213 |

FOREIGN PATENT DOCUMENTS

| | | | |
|---|---|---|---|
| WO | 2008093174 A1 | 8/2008 | |

OTHER PUBLICATIONS

Virtual server-SAN connectivity, 2006, Emulex pp. 5.*

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, 11 pages.

Droux, N.; "Crossbow Virtualization Architecture"; Aug. 28, 2007; Solaris Core OS, Sun Microsystems, Inc.; 51 pages.

Tripathi, S.; "Data Path: Soft Ring Set (SRS) and Soft Rings for Dynamic Polling & Parallelization"; Jul. 23, 2007; 7 pages.

Tripathi, S.; "Crossbow Architectural Document"; Nov. 21, 2006; 19 pages.

Droux, N.; "Crossbow: Network Virtualization and Bandwidth Partitioning"; presented at CHOSUG, Jun. 19, 2007; 23 pages.

Nordmark; E.; "IP Instances—Network Virtualization Meets Zones"; presented at SVOSUG, Oct. 26, 2006; 28 pages.

Tripathi, S.; "CrossBow: Network Virtualization and Resource Control"; presented at SVOSUG, Aug. 24, 2006; 27 pages.

Tripathi, S.; "CrossBow: Network Virtualization and Resource Control"; presented at Sun Labs Open House; Jun. 1, 2006; 24 pages.

Tripathi, S.; "Solaris Networking—The Magic Revealed (Part I)"; Sunay Tripathi's Solaris Networking Weblog; Nov. 14, 2005; (22 pages).

Tripathi, S.; "CrossBow: Solaris Network Virtualization and Resource Control"; Crossbow Architectual Document, Nov. 21, 2006; 19 pages.

Nordmark, E. et al. ; "IP Instances Interface Document"; PSARC 2006/366, Dec. 28, 2006; 17 pages.

Nordmark, E.; "IP Instances Design Document"; PSARC 2006/366, Dec. 21, 2006; 38 pages.

Tripathi, S.; "CrossBow: Solaris Network Virtualization & Resource Control"; CrossBow Overview Document, Aug. 23, 2006; 12 pges.

Kumar, R., ASI and PCI Express: Complementary Solutions, Dec. 1, 2004, RTC Magazine, Retrieved from the Internet <rtcmagazine.com/articles/view1100274>, (5 pages).

Martinez, R., Alfaro, F.J., and Sanchez, J.L., Providing Quality of Service Over Advanced Switching, Jan. 1, 2006, IEEE, Retrieved from the Internet, <ieeexplore.ieee.org/xpls/abs_all.jsp?arnumber=1655667Mag=1>, 10 pages.

Apani, Brave New World, Feb. 1, 2007, iSmile, Retrieved from the Internet, <isimile.com/PDFs/ Apani_Segmentation_WP.pdf>, 8 pages.

Trapeze, Trapeze Overview, Jan. 1, 1998, USENIX, Retrieved from the Internet, <usenix.org/publications/library/ proceedings/ usenix98/full_papers/anderson/anderson_html/node4.html>, 2 pages.

Popuri, S., OpenSolaris Virtualization Technologies, Feb. 23, 2007, Retrieved from the Internet,<hub.opensolaris.org/bin/view/Community+Group+advocacy/techdays%2Darchive%2D06%2D07>, 2 pages.

Office Action in United States Patent and Trademark Office for U.S. Appl. No. 11/953,829, Mailed Aug. 4, 2010 (30 Pages).

Office Action in United States Patent and Trademark Office for U.S. Appl. No. 11/953,837, Mailed Jun. 11, 2010 (27 Pages).

Office Action in United States Patent and Trademark Office for U.S. Appl. No. 11/953,839, Mailed Aug. 19, 2010 (30 Pages).

Office Action in United States Patent and Trademark Office for U.S. Appl. No. 12/040,165, Mailed Feb. 8, 2010 (40 Pages).

Notice of Allowance in United States Patent and Trademark Office for U.S. Appl. No. 12/040,165, Mailed Oct. 29, 2010 (18 Pages).

Office Action in United States Patent and Trademark Office for U.S. Appl. No. 12/040,101, Mailed May 6, 2010 (39 Pages).

Office Action in United States Patent and Trademark Office for U.S. Appl. No. 11/953,842, Mailed Apr. 30, 2010 (39 Pages).

Final Office Action in United States Patent and Trademark Office for U.S. Appl. No. 11/953,842, Mailed Oct. 15, 2010 (32 Pages).

Office Action in United States Patent and Trademark Office for U.S. Appl. No. 12/040,105, Mailed Nov. 20, 2009 (93 Pages).

Final Office Action in United States Patent and Trademark Office for U.S. Appl. No. 12/040,105, Mailed May 26, 2010 (26 Pages).

Notice of Allowance in United States Patent and Trademark Office for U.S. Appl. No. 12/040,105, Mailed Oct. 5, 2010 (27 Pages).
Office Action in United States Patent and Trademark Office for U.S. Appl. No. 11/953,843, Mailed May 3, 2010 (169 Pages).
Final Office Action in United States Patent and Trademark Office for U.S. Appl. No. 11/953,843, Mailed Oct. 15, 2010 (33 Pages).
Office Action in United States Patent and Trademark Office for U.S. Appl. No. 12/053,666, Mailed Dec. 10, 2009 (36 Pages).
Final Office Action in United States Patent and Trademark Office for U.S. Appl. No. 12/053,666, Mailed Jun. 11, 2010 (27 Pages).
Notice of Allowance in United States Patent and Trademark Office for U.S. Appl. No. 12/053,666, Mailed Oct. 7, 2010 (15 Pages).
Office Action in United States Patent and Trademark Office for U.S. Appl. No. 12/053,676, Mailed Dec. 9, 2009 (41 Pages).
Notice of Allowance in United States Patent and Trademark Office for U.S. Appl. No. 12/053,676, Mailed Jul. 15, 2010 (20 Pages).
Goldenberg, D. et al.; "Zero Copy Sockets Direct Protocol over InfiniBand—Preliminary Implementation and Performance Analysis"; Proceedings of the 13th Symposium on High Performance Interconnects; Piscataway, NJ; Aug. 17-19, 2005; pp. 128-137 (10 pages).
"I/O Virtualization Using Mellanox InfiniBand and Channel I/O Virtualization (CIOV) Technology"; XP-002541674; 2007; Retrieved from the Internet: <http://www.mellanox.com/pdf/whitepapersNVP_Virtualize_with_IB.pdf>; pp. 1-16 (16 pages).

"InfiniBand Software Stack"; XP-002541744; Jan. 1, 2006; Retrieved from the Internet: <http://download.microsoft.com/download/c/3/1/c318044c-95e8-4df9-a6af-81cdcb3c53c5/Mellanox%20Technologies%20-%20Infiniband%20Software%20Stack%20-%20WinIB%20-%20external.PDF>; pp. 1-2 (2 pages).
Wheeler, B.; "10 Gigabit Ethernet in Servers: Benefits and Challenges"; XP-002541745; Jan. 2005; Retrieved from the Internet: <http://www.hp.com/products1/serverconnectivity/adapters/ethernet/10gbe/infolibrary110GbE_White_Paper.pdf> (8 pages).
"Windows Platform Design Notes: Winsock Direct and Protocol Offload on SANs"; XP-002541746; Mar. 3, 2001; Retrieved from the Internet: <http://download.microsoft.com/download/1/6/1/161ba512-40e2-4cc9-843a-923143f3456c/WinsockDirect-ProtocolOffload.doc> (8 pages).
International Search Report from PCT/US2009/048594 dated Sep. 7, 2009 (4 pages).
Written Opinion from PCT/US2009/048594 dated Sep. 7, 2009 (1 page).
International Search Report dated Aug. 19, 2009 (3 pages).
International Preliminary Report on Patentability issued in PCT/US2009/035405, Dated Sep. 10, 2010. (9 Pages).
Final Office Action in United States Patent and Trademark Office for U.S. Appl. No. 12/040,101, Mailed Dec. 13, 2010 (25 Pages).

* cited by examiner

METHOD AND SYSTEM FOR CREATING A VIRTUAL ROUTER IN A BLADE CHASSIS TO MAINTAIN CONNECTIVITY

BACKGROUND

Conventionally, in the computer-related arts, a network is an arrangement of physical computer systems configured to communicate with each other. In some cases, the physical computer systems include virtual machines, which may also be configured to interact with the network (i.e., communicate with other physical computers and/or virtual machines in the network). Many different types of networks exist, and a network may be classified based on various aspects of the network, such as scale, connection method, functional relationship of computer systems in the network, and/or network topology.

Regarding connection methods, a network may be broadly categorized as wired (using a tangible connection medium such as Ethernet cables) or wireless (using an intangible connection medium such as radio waves). Different connection methods may also be combined in a single network. For example, a wired network may be extended to allow devices to connect to the network wirelessly. However, core network components such as routers, switches, and servers are generally connected using physical wires. Ethernet is defined within the Institute of Electrical and Electronics Engineers (IEEE) 802.3 standards, which are supervised by the IEEE 802.3 Working Group.

To create a wired network, computer systems must be physically connected to each other. That is, the ends of physical wires (for example, Ethernet cables) must be physically connected to network interface cards in the computer systems forming the network. To reconfigure the network (for example, to replace a server or change the network topology), one or more of the physical wires must be disconnected from a computer system and connected to a different computer system.

SUMMARY

In general, in one aspect, the invention relates to a method for migrating a first virtual machine (VM), that includes transmitting a first packet between the first VM and a second VM using a first virtual network interface card (VNIC) and a second VNIC prior to migration. The first VM executes on a first blade in a first blade chassis prior to migration, and the second VM executes on a second blade in a second blade chassis. The first VNIC is associated with the first VM and the second VNIC is associated with the second VM. The method further includes migrating the first VM and the first VNIC to the second blade, identifying a subnet of the first VM, identifying a subnet of the second VM, wherein the subnet of the second VM is different from the subnet of the first VM, and creating a virtual router to execute on the second blade. The virtual router is associated with a third VNIC and a fourth VNIC. A first network address in the subnet of the first VM is assigned to the third VNIC. A second network address in the subnet of the second VM is assigned to the fourth VNIC. The method further includes creating a first virtual switch to connect the first VNIC to the third VNIC, creating a second virtual switch to connect the second VNIC to the fourth VNIC, and routing a second packet between the first VM and the second VM using the virtual router after migration.

In general, in one aspect, the invention relates to a computer system for migrating a first virtual machine (VM), that includes a processor, a memory, and software instructions stored in the memory. The software instructions enable the computer system to transmit a first packet between the first VM and a second VM using a first virtual network interface card (VNIC) and a second VNIC prior to migration. The first VM executes on a first blade in a first blade chassis prior to migration. The second VM executes on a second blade in a second blade chassis. The first VNIC is associated with the first VM and the second VNIC is associated with the second VM. The software instructions further enable the computer system to migrate the first VM and the first VNIC to the second blade, identify a subnet of the first VM, identify a subnet of the second VM, wherein the subnet of the second VM is different from the subnet of the first VM, and create a virtual router to execute on the second blade, wherein the virtual router is associated with a third VNIC and a fourth VNIC, wherein a first network address in the subnet of the first VM is assigned to the third VNIC, wherein a second network address in the subnet of the second VM is assigned to the fourth VNIC. The software instructions further enable the computer system to create a first virtual switch to connect the first VNIC to the third VNIC, create a second virtual switch to connect the second VNIC to the fourth VNIC, and route a second packet between the first VM and the second VM using the virtual router after migration.

In general, in one aspect, the invention relates to a computer readable medium that includes computer readable program code embodied therein for causing a computer system to transmit a first packet between the first VM and a second VM using a first virtual network interface card (VNIC) and a second VNIC prior to migration. The first VM executes on a first blade in a first blade chassis prior to migration. The second VM executes on a second blade in a second blade chassis. The first VNIC is associated with the first VM and the second VNIC is associated with the second VM. The computer readable program code further cause the computer system to migrate the first VM and the first VNIC to the second blade, identify a subnet of the first VM, identify a subnet of the second VM, wherein the subnet of the second VM is different from the subnet of the first VM, and create a virtual router to execute on the second blade, wherein the virtual router is associated with a third VNIC and a fourth VNIC, wherein a first network address in the subnet of the first VM is assigned to the third VNIC, wherein a second network address in the subnet of the second VM is assigned to the fourth VNIC. The computer readable program code further cause the computer system to create a first virtual switch to connect the first VNIC to the third VNIC, create a second virtual switch to connect the second VNIC to the fourth VNIC, and route a second packet between the first VM and the second VM using the virtual router after migration.

Other aspects of the invention will be apparent from the following description and the appended claims.

DETAILED DESCRIPTION

Figure 1:
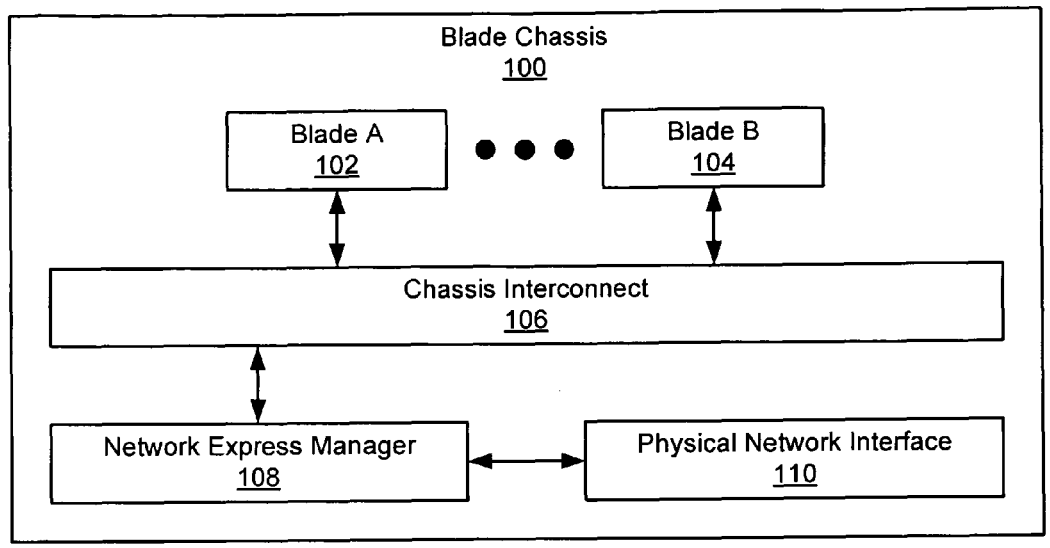
FIG. 1 shows a diagram of a blade chassis in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for migrating virtual machines. Specifically, embodiments of the invention provide a method for two virtual machines in different subnets to continue communication after one of virtual machines is migrated to the same blade (i.e., target blade) as the other virtual machine. In one or more embodiments of the invention, the two virtual machines initially communicate through a physical router which connects the two subnets. When the virtual machine is migrated to the target blade, a virtual router and virtual switches are created on the target blade. The virtual router and virtual switches allow for the two virtual machines to continue communication without having to change the virtual machines or the virtual network interface cards (VNICs) associated with the virtual machines.

FIG. 1 shows a diagram of a blade chassis (100) in accordance with one or more embodiments of the invention. The blade chassis (100) includes multiple blades (e.g., blade A (102), blade B (104)) communicatively coupled with a chassis interconnect (106). For example, the blade chassis (100) may be a Sun Blade 6048 Chassis by Sun Microsystems Inc., an IBM BladeCenter® chassis, an HP BladeSystem enclosure by Hewlett Packard Inc., or any other type of blade chassis. The blades may be of any type(s) compatible with the blade chassis (100). BladeCenter® is a registered trademark of International Business Machines, Inc. (IBM), headquartered in Armonk, N.Y.

In one or more embodiments of the invention, the blades are configured to communicate with each other via the chassis interconnect (106). Thus, the blade chassis (100) allows for communication between the blades without requiring traditional network wires (such as Ethernet cables) between the blades. For example, depending on the type of blade chassis (100), the chassis interconnect (106) may be a Peripheral Component Interface Express (PCI-E) backplane, and the blades may be configured to communicate with each other via PCI-E endpoints. Those skilled in the art will appreciate that other connection technologies may be used to connect the blades to the blade chassis.

Continuing with the discussion of FIG. 1, to communicate with clients outside the blade chassis (100), the blades are configured to share a physical network interface (110). The physical network interface (110) includes one or more network ports (for example, Ethernet ports), and provides an interface between the blade chassis (100) and the network (i.e., interconnected computer systems external to the blade chassis (100)) to which the blade chassis (100) is connected. The blade chassis (100) may be connected to multiple networks, for example using multiple network ports.

In one or more embodiments, the physical network interface (110) is managed by a network express manager (108). Specifically, the network express manager (108) is configured to manage access by the blades to the physical network interface (110). The network express manager (108) may also be configured to manage internal communications between the blades themselves, in a manner discussed in detail below. The network express manager (108) may be any combination of hardware, software, and/or firmware including executable logic for managing network traffic.

Figure 2:
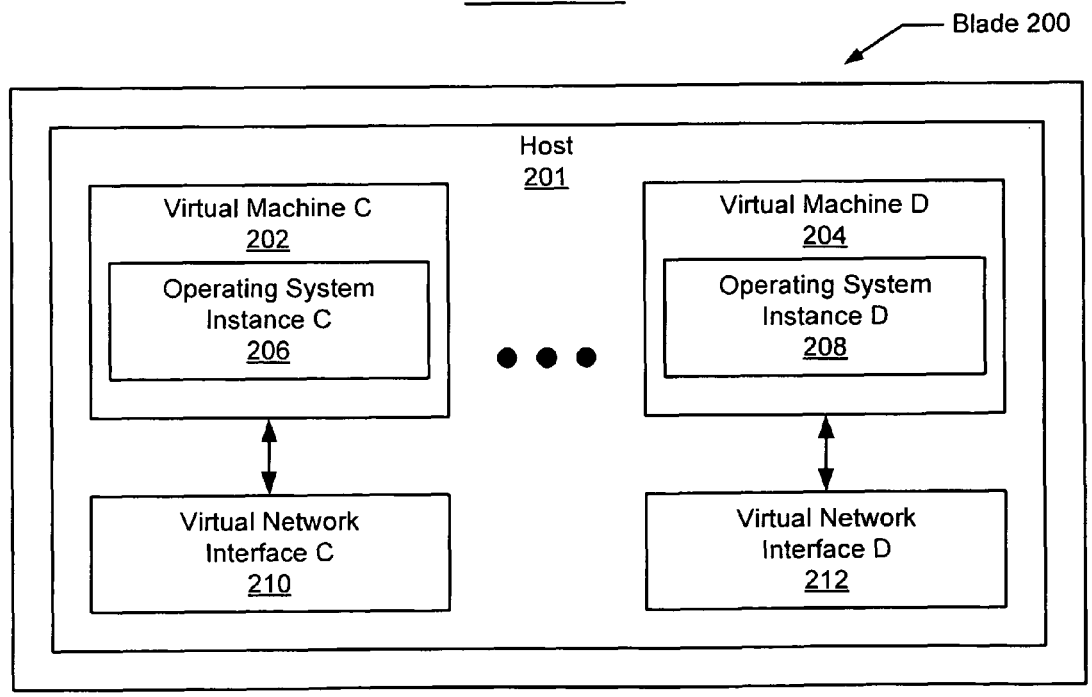
FIG. 2 shows a diagram of a blade in accordance with one or more embodiments of the invention.

FIG. 2 shows a diagram of a blade (200) in accordance with one or more embodiments of the invention. "Blade" is a term of art referring to a computer system located within a blade chassis (for example, the blade chassis (100) of FIG. 1). Blades typically include fewer components than stand-alone computer systems or conventional servers. In one embodiment of the invention, fully featured stand-alone computer systems or conventional servers may also be used instead of or in combination with the blades. Generally, blades in a blade chassis each include one or more processors and associated memory. Blades may also include storage devices (for example, hard drives and/or optical drives) and numerous other elements and functionalities typical of today's computer systems (not shown), such as a keyboard, a mouse, and/or output means such as a monitor. One or more of the aforementioned components may be shared by multiple blades located in the blade chassis. For example, multiple blades may share a single output device.

Continuing with discussion of FIG. 2, the blade (200) includes a host operating system (not shown) configured to execute one or more virtual machines (e.g., virtual machine C (202), virtual machine D (204)). Broadly speaking, the virtual machines are distinct operating environments configured to inherit underlying functionality of the host operating system via an abstraction layer. In one or more embodiments of the invention, each virtual machine includes a separate instance of an operating system (e.g., operating system instance C (206), operating system instance D (208)). For example, the Xen® virtualization project allows for multiple guest operating systems executing in a host operating system. Xen® is a trademark overseen by the Xen Project Advisory Board. In one embodiment of the invention, the host operating system supports virtual execution environments (not shown). An example of virtual execution environment is a Solaris™ Container. In such cases, the Solaris™ Container may execute in the host operating system, which may be a Solaris™ operating system. Solaris™ is a trademark of Sun Microsystems, Inc. In one embodiment of the invention, the host operating system may include both virtual machines and virtual execution environments.

Many different types of virtual machines and virtual execution environment exist. Further, the virtual machines may include many different types of functionality, such as a switch, a router, a firewall, a load balancer, an application server, any other type of network-enabled service, or any combination thereof.

In one or more embodiments of the invention, the virtual machines and virtual execution environments inherit network connectivity from the host operating system via VNICs (e.g., VNIC C (210), VNIC D (212)). To the virtual machines and the virtual execution environments, the VNICs appear as physical NICs. In one or more embodiments of the invention, the use of VNICs allows an arbitrary number of virtual machines or and virtual execution environments to share the blade's (200) networking functionality. Further, in one or more embodiments of the invention, each virtual machine or and virtual execution environment may be associated with an arbitrary number of VNICs, thereby providing increased flexibility in the types of networking functionality available to the virtual machines and/or and virtual execution environments. For example, a virtual machine may use one VNIC for incoming network traffic, and another VNIC for outgoing network traffic. VNICs in accordance with one or more embodiments of the invention are described in detail in commonly owned U.S. patent application Ser. No. 11/489,942, entitled "Multiple Virtual Network Stack Instances using Virtual Network Interface Cards," in the names of Nicolas G. Droux, Erik Nordmark, and Sunay Tripathi, the contents of which are hereby incorporated by reference in their entirety.

VNICs in accordance with one or more embodiments of the invention also are described in detail in commonly owned U.S. patent application Ser. No. 11/480,000, entitled "Method and System for Controlling Virtual Machine Bandwidth" in the names of Sunay Tripathi, Tim P. Marsland, and Nicolas G. Droux the contents of which are hereby incorporated by reference in their entirety.

In one embodiment of the invention, one of the blades in the blade chassis includes a control operating system executing in a virtual machine (also referred to as the control virtual machine). The control operating system is configured to manage the creation and maintenance of the virtual wires and/or virtual network paths (discussed below). In addition, the control operating system also includes functionality to migrate virtual machines between blades in the blade chassis (discussed below).

Figure 3:
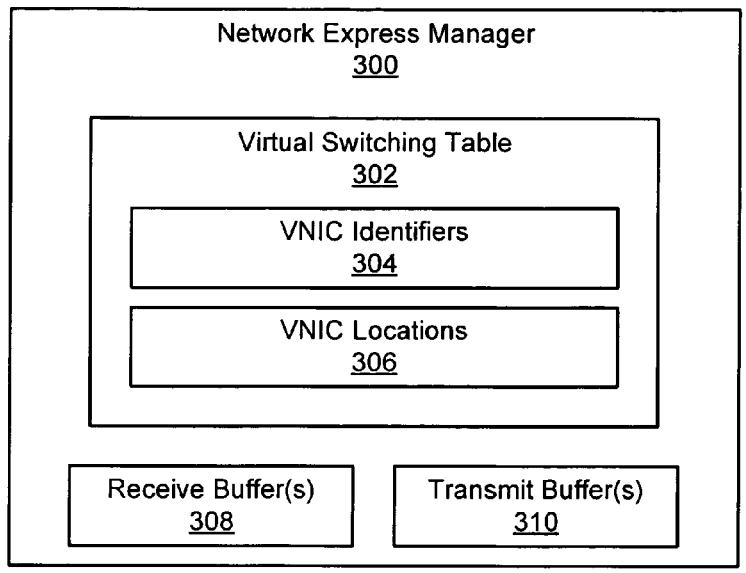
FIG. 3 shows a diagram of a network express manager in accordance with one or more embodiments of the invention.

Continuing with the discussion of FIG. 2, each blade's networking functionality (and, by extension, networking functionality inherited by the VNICs) includes access to a shared physical network interface and communication with other blades via the chassis interconnect. FIG. 3 shows a diagram of a network express manager (300) in accordance with one or more embodiments of the invention. The network express manager (300) is configured to route network traffic traveling to and from VNICs located in the blades. Specifically, the network express manager (300) includes a virtual switching table (302), which includes a mapping of VNIC identifiers (304) to VNIC locations (306) in the chassis interconnect. In one or more embodiments, the VNIC identifiers (304) are Internet Protocol (IP) addresses, and the VNIC locations (306) are PCI-E endpoints associated with the blades (e.g., if the chassis interconnect is a PCI-E backplane). In another embodiment of the invention, the VNIC identifiers (304) may be media access control (MAC) addresses. Alternatively, another routing scheme may be used.

In one or more embodiments, the network express manager (300) is configured to receive network traffic via the physical network interface and route the network traffic to the appropriate location (i.e., where the VNIC is located) using the virtual switching table (302). In one embodiment of the invention, once a determination is made about where to route a given packet, the packet is stored in the appropriate receive buffer (308) or transmit buffer (310). In one embodiment of the invention, each VNIC listed in the virtual switching table (302) is associated with a receive buffer (308) and a transmit buffer (310). The receive buffer (308) is configured to temporarily store packets destined for a given VNIC prior to the VNIC receiving (via a polling or interrupt mechanism) the packets. Similarly, the transmit buffer (310) is configured to temporarily store packets received from the VNIC prior to send the packet towards its packet destination.

In one embodiment of the invention, the receive buffer (308) enables the VNICs to implement bandwidth control. More specifically, when the VNIC is implementing bandwidth control, packets remain in the receive buffer (308) until the VNIC (or an associated process) requests packets from the receive buffer (308). As such, if the rate at which packets are received is greater than the rate at which packets requested by the VNIC (or an associated process), then packets may be dropped from the receive buffer once the receive buffer is full. Those skilled in the art will appreciate that the rate at which packets are dropped from the receive buffer is determined by the size of the receive buffer.

Continuing with the discussion of FIG. 3, the network express manager (300) may be configured to route network traffic between different VNICs located in the blade chassis. In one or more embodiments of the invention, using the virtual switching table (302) in this manner facilitates the creation of a virtual network path, which includes virtual wires (discussed below). Thus, using the virtual switching table (302), virtual machines located in different blades may be interconnected to form an arbitrary virtual network topology, where the VNICs associated with each virtual machine do not need to know the physical locations of other VNICs. Further, if a virtual machine is migrated from one blade to another, the virtual network topology may be preserved by updating the virtual switching table (302) to reflect the corresponding VNIC's new physical location (for example, a different PCI-E endpoint).

In some cases, network traffic from one VNIC may be destined for a VNIC located in the same blade, but associated with a different virtual machine. In one or more embodiments of the invention, a virtual switch may be used to route the network traffic between the VNICs independent of the blade chassis. Virtual switches in accordance with one or more embodiments of the invention are discussed in detail in commonly owned U.S. patent application Ser. No. 11/480,261, entitled "Virtual Switch," in the names of Nicolas G. Droux, Sunay Tripathi, and Erik Nordmark, the contents of which are hereby incorporated by reference in their entirety.

Figure 4:
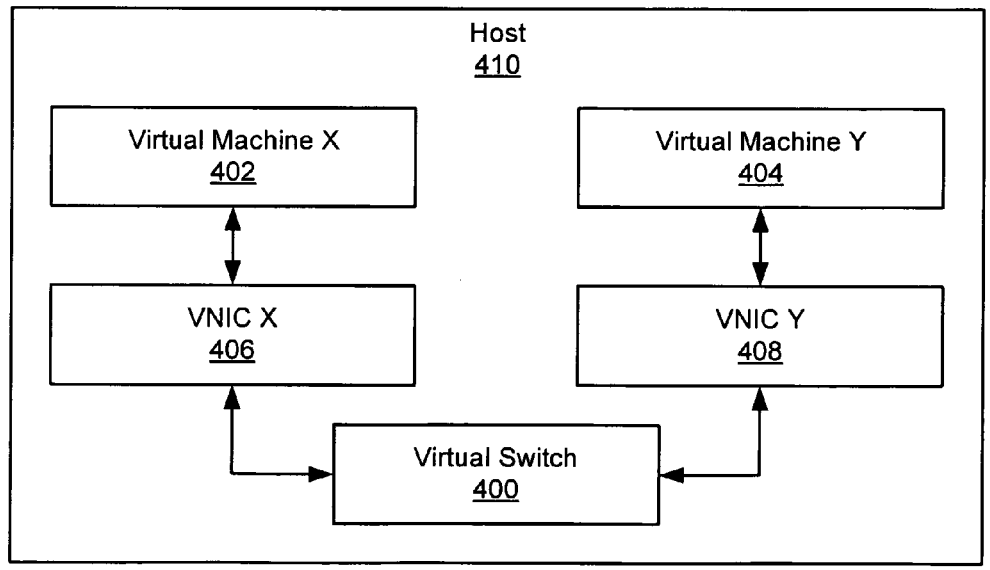
FIG. 4 shows a diagram of a virtual machine in accordance with one or more embodiments of the invention.

For example, FIG. 4 shows a diagram of a virtual switch (400) in accordance with one or more embodiments of the invention. The virtual switch (400) provides connectivity between VNIC X (406) associated with virtual machine X (402) and VNIC Y (408) associated with virtual machine Y (404). In one or more embodiments, the virtual switch (400) is managed by a host (410) within which virtual machine X (402) and virtual machine Y (404) are located. Specifically, the host (410) may be configured to identify network traffic targeted at a VNIC in the same blade, and route the traffic to the VNIC using the virtual switch (400). In one or more embodiments of the invention, the virtual switch (400) may reduce utilization of the blade chassis and the network express manager by avoiding unnecessary round-trip network traffic.

Figure 5:
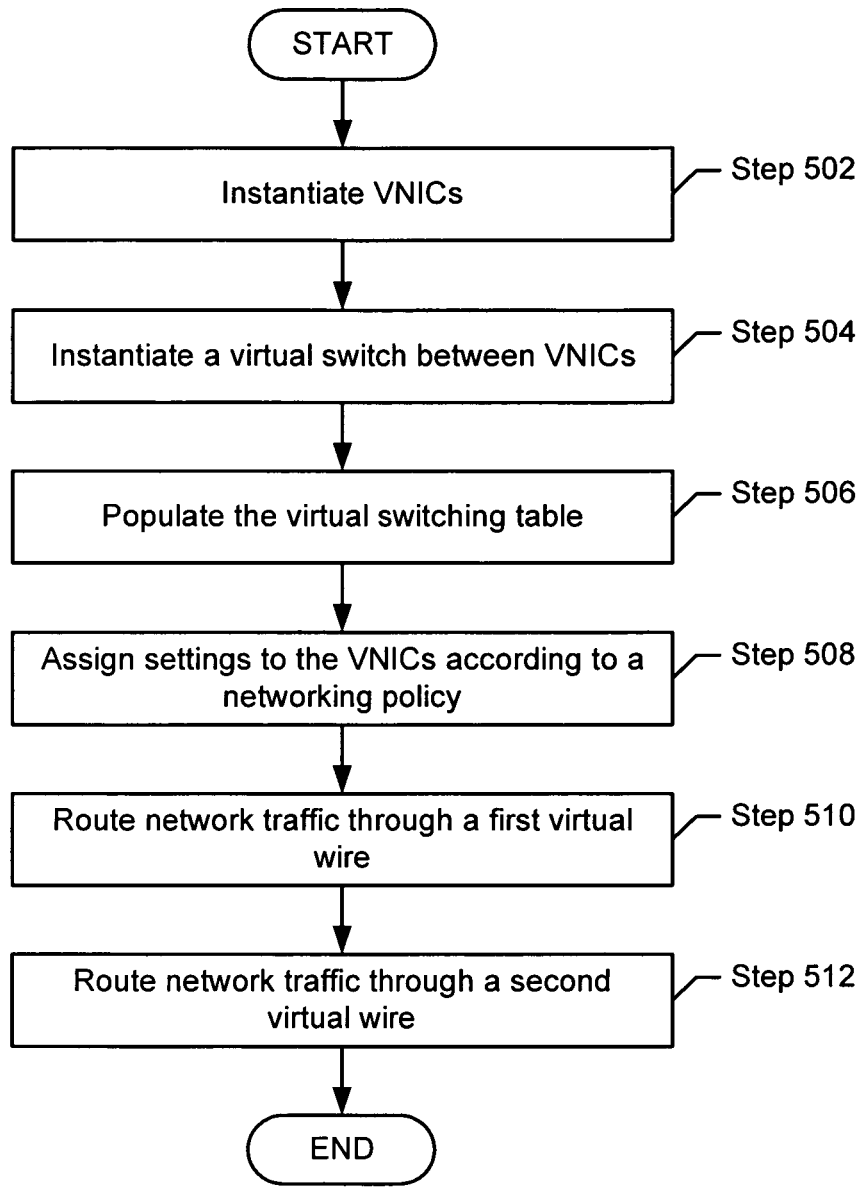
FIG. 5 shows a flowchart of a method for creating a virtual network path in accordance with one or more embodiments of the invention.

FIG. 5 shows a flowchart of a method for creating a virtual network path in accordance with one or more embodiments of the invention. In one or more embodiments of the invention, one or more of the steps shown in FIG. 5 may be omitted, repeated, and/or performed in a different order. Accordingly, embodiments of the invention should not be considered limited to the specific arrangement of steps shown in FIG. 5.

In one or more embodiments of the invention, in Step 502, VNICs are instantiated for multiple virtual machines. The virtual machines are located in blades, as discussed above. Further, the virtual machines may each be associated with one or more VNICs. In one or more embodiments of the invention, instantiating a VNIC involves loading a VNIC object in memory and registering the VNIC object with a host, i.e., an operating system that is hosting the virtual machine associated with the VNIC. Registering the VNIC object establishes an interface between the host's networking functionality and the abstraction layer provided by the VNIC. Thereafter, when the host receives network traffic addressed to the VNIC, the host forwards the network traffic to the VNIC. Instantiation of VNICs in accordance with one or more embodiments of the invention is discussed in detail in U.S. patent application Ser. No. 11/489,942, incorporated by reference above.

As discussed above, a single blade may include multiple virtual machines configured to communicate with each other. In one or more embodiments of the invention, in Step 504, a virtual switch is instantiated to facilitate communication between the virtual machines. As noted above, the virtual switch allows communication between VNICs independent of the chassis interconnect. Instantiation of virtual switches in accordance with one or more embodiments of the invention is discussed in detail in U.S. patent application Ser. No. 11/480,261, incorporated by reference above.

In one or more embodiments of the invention, in Step 506, a virtual switching table is populated. As noted above, the virtual switching table may be located in a network express manager configured to manage network traffic flowing to and from the virtual machines. Populating the virtual switching table involves associating VNIC identifiers (for example, IP addresses) with VNIC locations (for example, PCI-E endpoints). In one or more embodiments of the invention, the virtual switching table is populated in response to a user command issued via a control operating system, i.e., an operating system that includes functionality to control the network express manager.

In one or more embodiments of the invention, VNICs include settings for controlling the processing of network packets. In one or more embodiments of the invention, in Step 508, settings are assigned to the VNICs according to a networking policy. Many different types of networking policies may be enforced using settings in the VNICs. For example, a setting may be used to provision a particular portion of a blade's available bandwidth to one or more VNICs. As another example, a setting may be used to restrict use of a VNIC to a particular type of network traffic, such as Voice over IP (VoIP) or Transmission Control Protocol/IP (TCP/IP). Further, settings for multiple VNICs in a virtual network path may be identical. For example, VNICs in a virtual network path may be capped at the same bandwidth limit, thereby allowing for consistent data flow across the virtual network path. In one or more embodiments of the invention, a network express manager is configured to transmit the desired settings to the VNICs.

In one or more embodiments of the invention, once the VNICs are instantiated and the virtual switching table is populated, network traffic may be transmitted from a VNIC in one blade to a VNIC in another blade. The connection between the two VNICs may be thought of as a "virtual wire," because the arrangement obviates the need for traditional network wires such as Ethernet cables. A virtual wire functions similar to a physical wire in the sense that network traffic passing through one virtual wire is isolated from network traffic passing through another virtual wire, even though the network traffic may pass through the same blade (i.e., using the same virtual machine or different virtual machines located in the blade).

In one embodiment of the invention, each virtual wire may be associated with a priority (discussed below in FIGS. 11A-11C). In addition, each virtual wire may be associated with a security setting, which defines packet security (e.g., encryption, etc.) for packets transmitted over the virtual wire. In one embodiment of the invention, the bandwidth, priority and security settings are defined on a per-wire basis. Further, the aforementioned settings are the same for VNICs on either end of the virtual wire.

In one embodiment of the invention, a combination of two or more virtual wires may be thought of as a "virtual network path." In one embodiment of the invention, the bandwidth, priority and security settings for all virtual wires in the virtual network path are the same. Further, the aforementioned settings are the same for VNICs on either end of the virtual wires, which make up the virtual network path.

Continuing with the discussion of FIG. 5, once the virtual wires and/or virtual network paths have been created and configured, network traffic may be transmitted over the virtual network path through, for example, a first virtual wire (Step 510) and then through a second virtual wire (Step 512). For example, when receiving network traffic from a client via the physical network interface, one virtual wire may be located between the physical network interface and a VNIC, and a second virtual wire may be located between the VNIC and another VNIC. In one embodiment of the invention, at least Steps 502-508 are performed and/or managed by the control operating system.

Figure 6A:
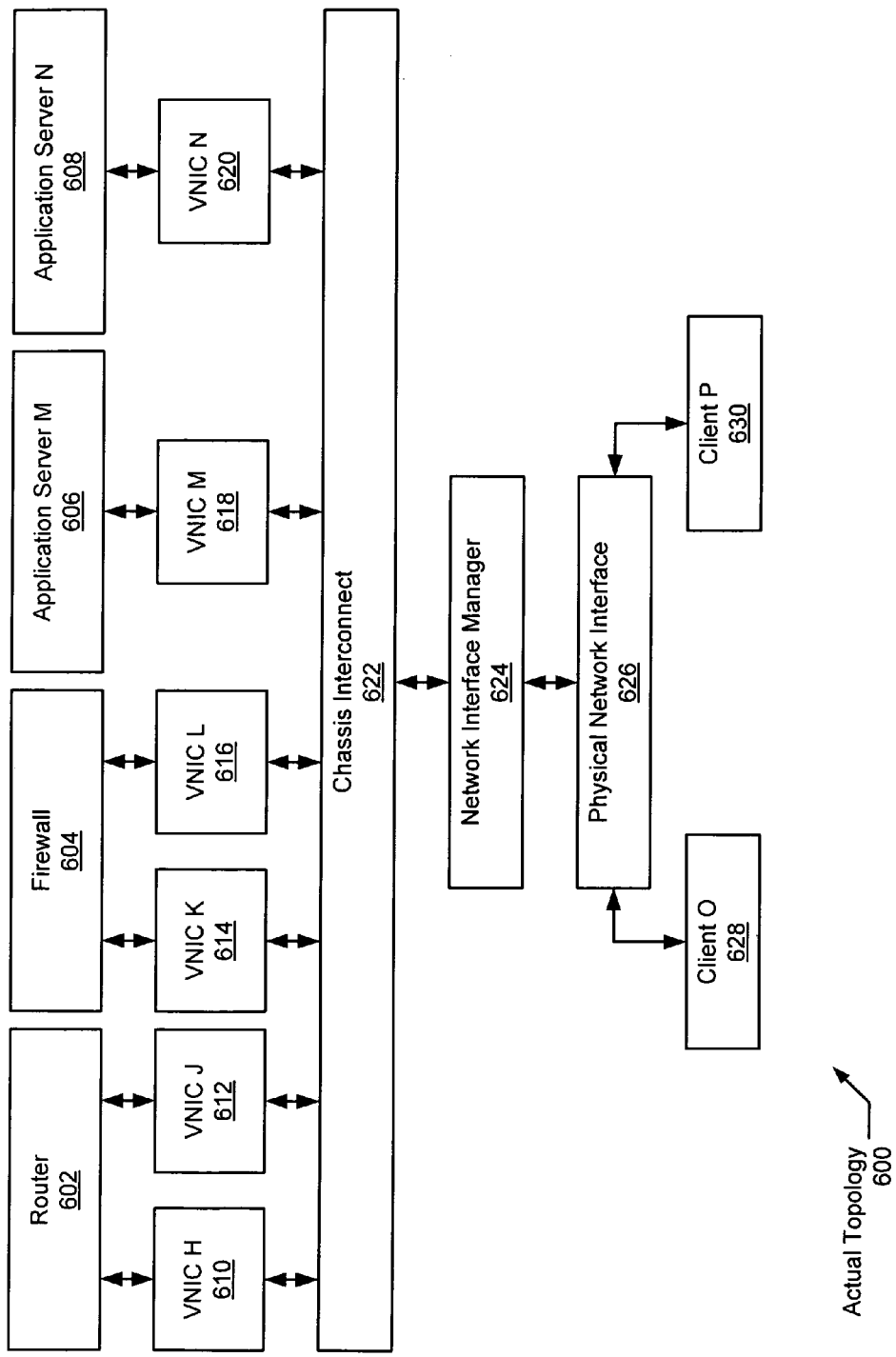
FIGS. 6A-6C show an example of creating virtual network paths in accordance with one or more embodiments of the invention.
Figure 6B:
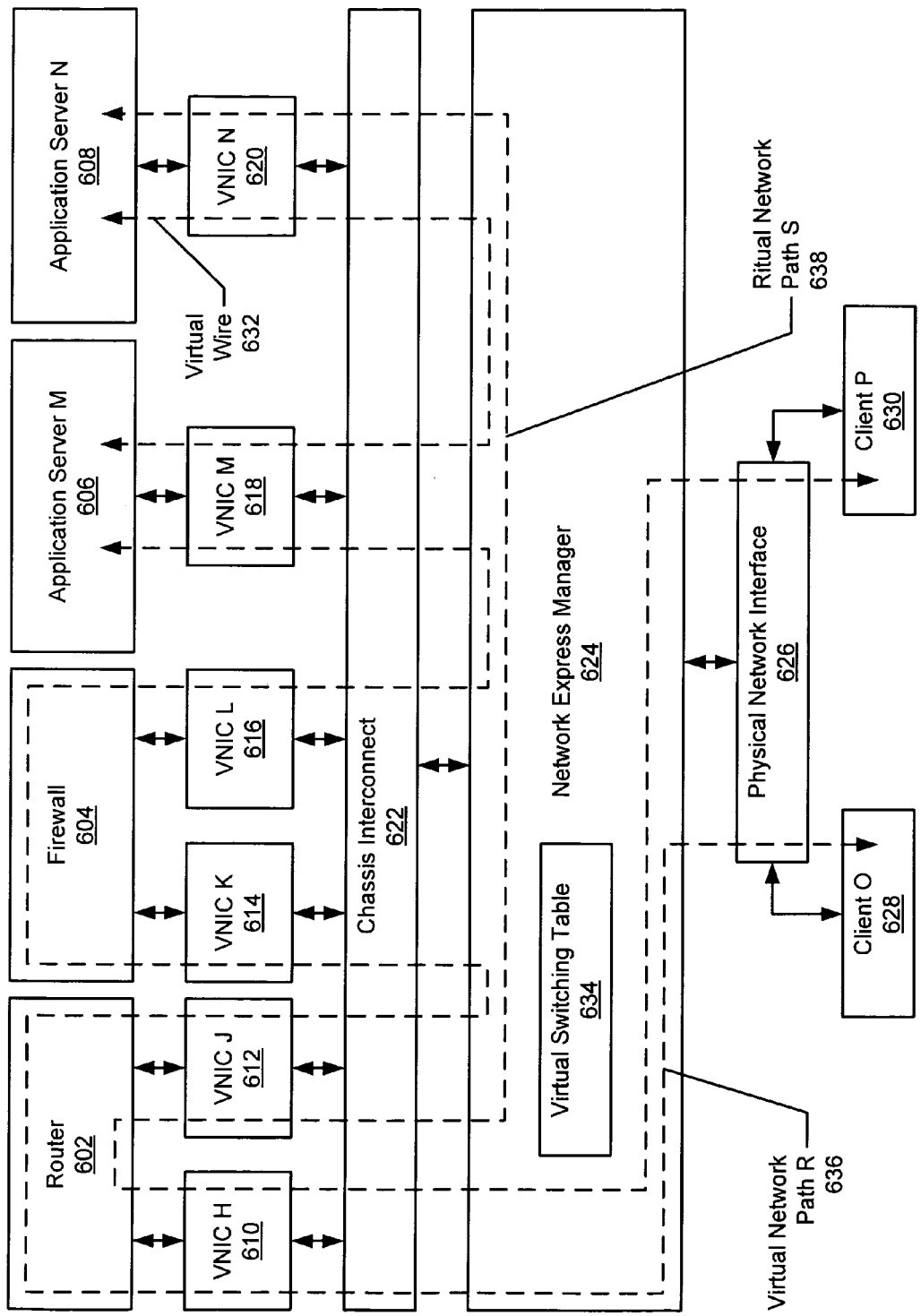
Figure 6C:
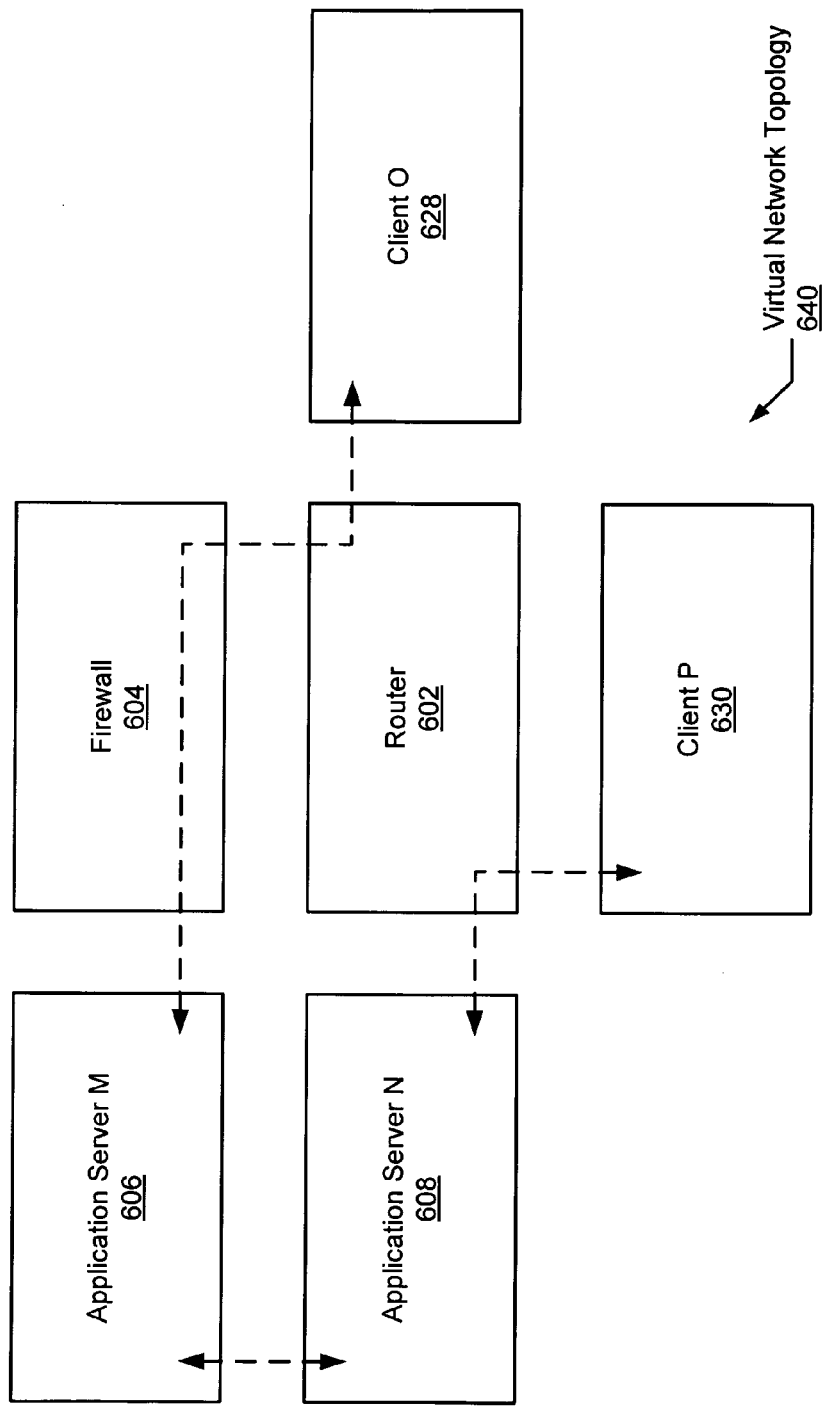

FIGS. 6A-6C show an example of creating virtual network paths in accordance with one or more embodiments of the invention. Specifically, FIG. 6A shows a diagram of an actual topology (600) in accordance with one or more embodiments of the invention, FIG. 6B shows how network traffic may be routed through the actual topology (600), and FIG. 6C shows a virtual network topology (640) created by routing network traffic as shown in FIG. 6B. FIGS. 6A-6C are provided as examples only, and should not be construed as limiting the scope of the invention.

Referring first to FIG. 6A, the actual topology (600) includes multiple virtual machines. Specifically, the actual topology (600) includes a router (602), a firewall (604), application server M (606), and application server N (608), each executing in a separate virtual machine. The virtual machines are located in blades communicatively coupled with a chassis interconnect (622), and include networking functionality provided by the blades via VNICs (i.e., VNIC H (610), VNIC J (612), VNIC K (614), VNIC M (618), and VNIC N (620)). As shown in FIG. 6A, each virtual machine is communicatively coupled to all other virtual machines. However, as discussed below, while there is full connectivity between the virtual machines, embodiments of the invention create virtual wires and/or virtual network paths to limit the connectivity of the virtual machines. For ease of illustration, the blades themselves are not shown in the diagram.

In one or more embodiments of the invention, the router (602), the firewall (604), application server M (606), and application server N (608) are each located in separate blades. Alternatively, as noted above, a blade may include multiple virtual machines. For example, the router (602) and the firewall (604) may be located in a single blade. Further, each virtual machine may be associated with a different number of VNICs than the number of VNICs shown in FIG. 6A.

Continuing with discussion of FIG. 6A, a network express manager (624) is configured to manage network traffic flowing to and from the virtual machines. Further, the network express manager (624) is configured to manage access to a physical network interface (626) used to communicate with client 0 (628) and client P (630).

In FIG. 6A, the virtual machines, VNICs, chassis interconnect (622), network express manager (624), and physical network interface (626) are all located within a chassis interconnect. Client 0 (628) and client P (630) are located in one or more networks (not shown) to which the chassis interconnect is connected.

FIG. 6B shows how network traffic may be routed through the actual topology (600) in accordance with one or more embodiments of the invention. In one or more embodiments of the invention, the routing is performed by the network express manager (624) using a virtual switching table (634).

As discussed above, network traffic routed to and from the VNICs may be thought of as flowing through a "virtual wire." For example, FIG. 6B shows a virtual wire (632) located between application server M (606) and application server N (608). To use the virtual wire, application server M (606) transmits a network packet via VNIC M (618). The network packet is addressed to VNIC N (620) associated with application server N (608). The network express manager (624) receives the network packet via the chassis interconnect (622), inspects the network packet, and determines the target VNIC location using the virtual switching table (634). If the target VNIC location is not found in the virtual switching table (634), then the network packet may be dropped. In this example, the target VNIC location is the blade in which VNIC N (620) is located. The network express manager (624) routes the network packet to the target VNIC location, and application server N (608) receives the network packet via VNIC N (620), thereby completing the virtual wire (632). In one or more embodiments of the invention, the virtual wire (632) may also be used to transmit network traffic in the opposite direction, i.e., from application server N (608) to application server M (606).

Further, as discussed above, multiple virtual wires may be combined to form a "virtual network path." For example, FIG. 6B shows virtual network path R (636), which flows from client 0 (628), through the router (602), through the firewall (604), and terminates at application server M (606). Specifically, the virtual network path R (636) includes the following virtual wires. A virtual wire is located between the physical network interface (626) and VNIC H (610). Another virtual wire is located between VNIC J (612) and VNIC K (614). Yet another virtual wire is located between VNIC L (616) and VNIC M (618). If the router (602) and the firewall (604) are located in the same blade, then a virtual switch may be substituted for the virtual wire located between VNIC J (612) and VNIC K (614), thereby eliminating use of the chassis interconnect (622) from communications between the router (602) and the firewall (604).

Similarly, FIG. 6B shows virtual network path S (638), which flows from client P (630), through the router (602), and terminates at application server N (608). Virtual network path S (638) includes a virtual wire between the physical network interface (626) and VNIC H (610), and a virtual wire between VNIC J (612) and VNIC N (620). The differences between virtual network path R (636) and virtual network path S (638) exemplify how multiple virtual network paths may be located in the same blade chassis.

In one or more embodiments of the invention, VNIC settings are applied separately for each virtual network path. For example, different bandwidth limits may be used for virtual network path R (636) and virtual network path S (638). Thus, the virtual network paths may be thought of as including many of the same features as traditional network paths (e.g., using Ethernet cables), even though traditional network wires are not used within the blade chassis. However, traditional network wires may still be required outside the blade chassis, for example between the physical network interface (626) and client 0 (628) and/or client P (630).

FIG. 6C shows a diagram of the virtual network topology (640) that results from the use of the virtual network path R (636), virtual network path S (638), and virtual wire (632) shown in FIG. 6B. The virtual network topology (640) allows the various components of the network (i.e., router (602), firewall (604), application server M (606), application server N (608), client 0 (628), and client P (630)) to interact in a manner similar to a traditional wired network. However, as discussed above, communication between the components located within the blade chassis (i.e., router (602), firewall (604), application server M (606), and application server N (608)) is accomplished without the use of traditional network wires.

Embodiments of the invention allow for virtual network paths to be created using virtual wires, without the need for traditional network wires. Specifically, by placing virtual machines in blades coupled via a chassis interconnect, and routing network traffic using VNICs and a virtual switching table, the need for traditional network wires between the virtual machines is avoided. Thus, embodiments of the invention facilitate the creation and reconfiguration of virtual network topologies without the physical labor typically involved in creating a traditional wired network.

In one embodiment of the invention, one or more virtual machines may be migrated from one blade to another blade in the blade chassis. Migration may be necessitated by a number of factors. For example, a virtual machine may need to be migrated from one blade to another blade because the virtual machine requires additional resources, which are not available on the blade on which it is currently executing. Alternatively, a virtual machine may need to be migrated from one blade to another blade because the blade on which the virtual machine is currently executing is powering down, failing, and/or other suspending operation. Alternatively, the migration may be triggered based on a power management policy. For example, the power management policy may be to allow a blade or blade chassis to power down based on amount of use or time.

In one embodiment of the invention, at least the bandwidth constraint associated with virtual machine is preserved across the migration, such that at least the bandwidth constraint associated with virtual machine is the same before and after the migration of the virtual machine. Those skilled in the art will appreciate that the bandwidth associated with a given virtual machine is enforced by VNIC associated with the virtual machine. As the VNIC is located in the host executing on the blade, the host includes functionality to associate the VNIC with the virtual machine and set the bandwidth of the VNIC.

Figure 7A:
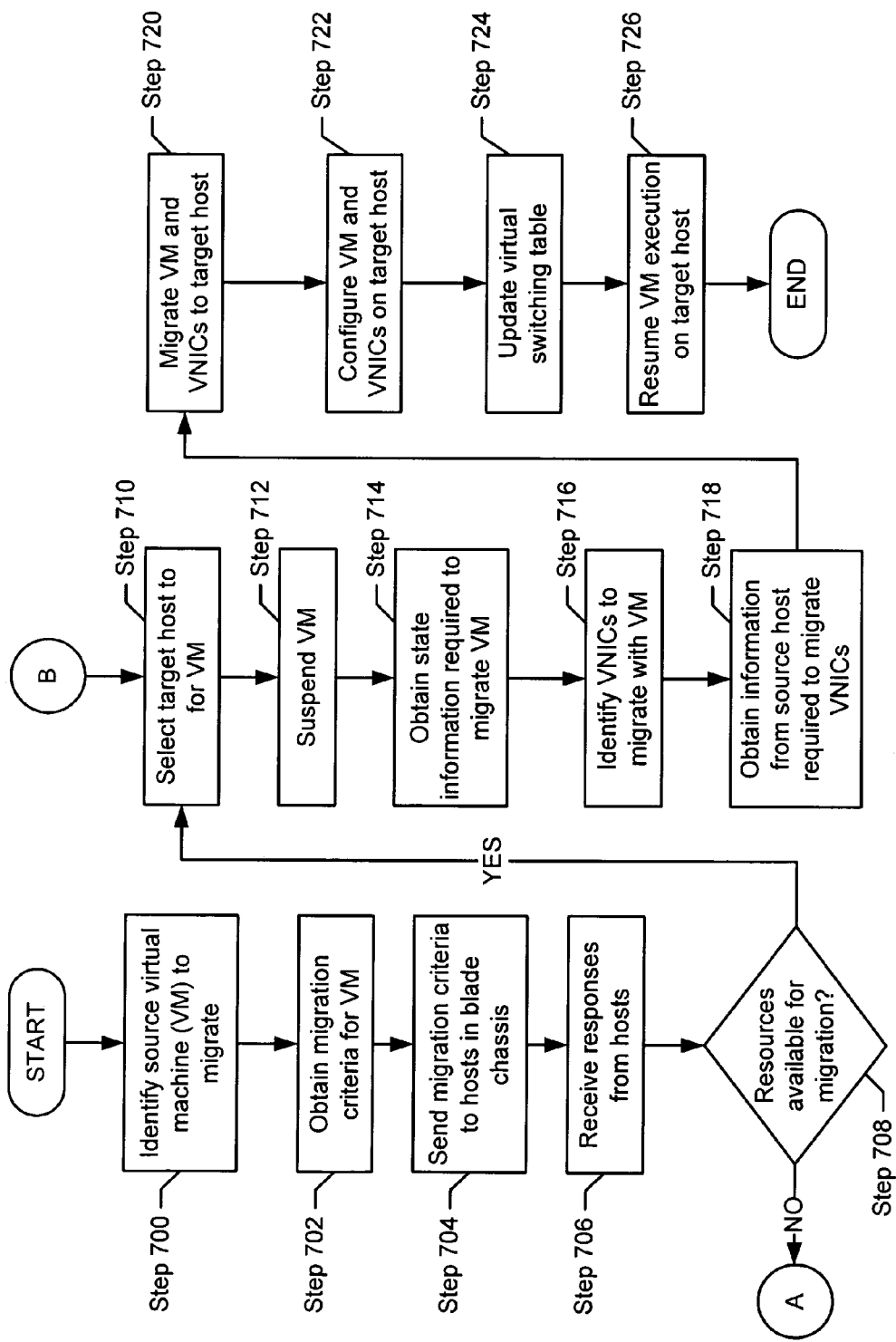
FIGS. 7A-7B show a flowchart of a method for migrating a virtual machine in accordance with one or more embodiments of the invention.
Figure 7B:
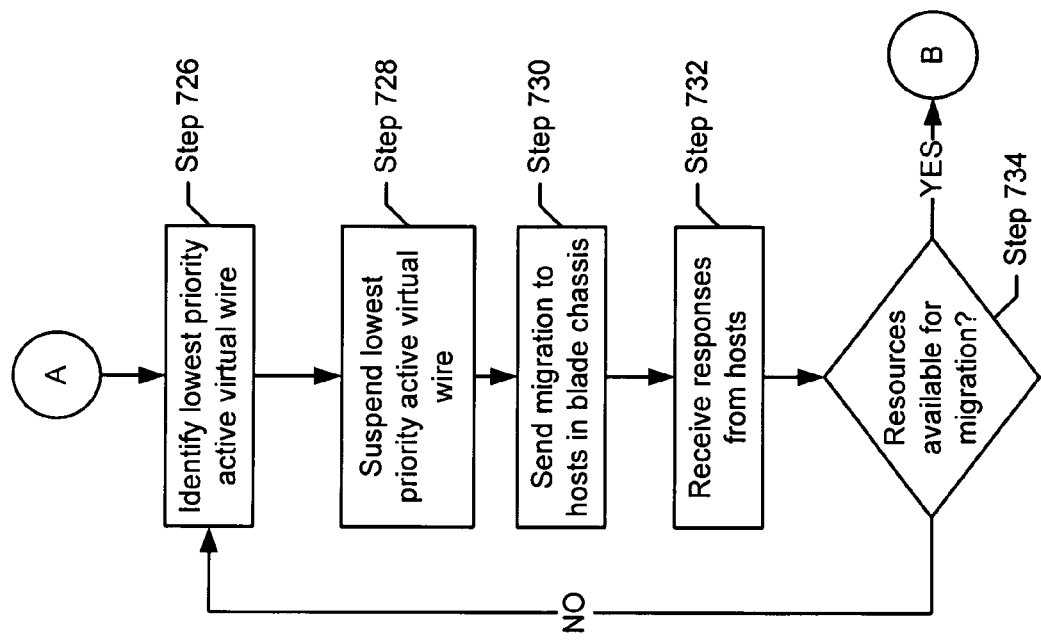

FIGS. 7A-7B show flowcharts of a method for migrating a virtual machine in accordance with one or more embodiments of the invention. In one or more embodiments of the invention, one or more of the steps shown in FIGS. 7A-7B may be omitted, repeated, and/or performed in a different order. Accordingly, embodiments of the invention should not be considered limited to the specific arrangement of steps shown in FIG. 7A-7B.

Referring to FIG. 7A, in Step 700, a virtual machine (VM) to migrate is identified. The determination of whether to migrate a given VM may be based on any number of factors, some of which are discussed above. In Step 207, migration criteria for the VM are obtained. In one embodiment of the invention, the migration criteria corresponds the bandwidth constraint of the VM (e.g., the minimum bandwidth and/or maximum bandwidth available to the VM), a hardware constraint (e.g., minimum amount of computing resources required by the VM), a software constraint (e.g., version of host operating system required by VM), and/or any other constraint required by the VM. In one embodiment of the invention, the migration constraints may be obtained from the VM, the host on which the VM is executing, the control operating system, or any combination thereof.

In Step 704, the control operating system sends a request including the migration criteria to hosts executing on blades in the blade chassis. In one embodiment of the invention, the control operating system uses a multicast message to send the request. In Step 706, the control operating system receives responses from the hosts. The responses may include: (i) a response indicating that the host which sent the response is unable to satisfy the migration criteria or (ii) a response indicating that the host which sent the response is able to satisfy the migration criteria.

In Step 708, a determination is made, using the responses received in Step 706, about whether there are sufficient resources available to migrate the VM. If there are insufficient resources, the method proceeds to FIG. 7B (described below). Alternatively, if there are sufficient resources, the method proceeds to Step 710. In Step 710, a target host is selected. The target host corresponds to a host to which the VM will be migrated. This selection is made by the control operating system based on the responses received in Step 706.

In Step 712, execution on the VM is suspended. In one embodiment of the invention, suspending the VM may also include suspending execution of associated VNICs (discussed below). In Step 714, state information required to migrate the VM is obtained. In one embodiment of the invention, the state information corresponds to information required to resume execution of the VM on the target host from the state of the VM prior to being suspended in Step 712.

In Step 716, the VNIC(s) to migrate with the VM is identified. Identifying the VNIC(s) corresponds to determining which VNIC(s) is associated with the VM. In one embodiment of the invention, a VNIC is associated with the VM if the VNIC is executing on the same host as the VM and the VM receives packets from and/or transmits packets to the VNIC. In Step 718, information required to migrate the VNIC identified in Step 716 is obtained. In one embodiment of the invention, the information corresponds to information required to resume execution of the VNIC on the target host from the state of the VNIC prior to suspending the VM in Step 712.

In Step 720, VM and VNIC(s) are migrated to the target host. In Step 722, the VM and VNIC(s) are configured on the target host. In one embodiment of the invention, the VM and VNIC(s) are configured such that they operate in the same manner on the target host as they operated on the source host (i.e., the host from which they were migrated). Configuring the VM and VNICs may also include configuring various portions of the target host. In one embodiment of the invention, the VM and VNIC(s) are configured using the information obtained in Steps 714 and 718. In one embodiment of the invention, Step 722 is initiated and monitored by the control operating system. In Step 724, the virtual switching table is updated to reflect that the VNIC(s) identified in Step 716 are on the target host. In Step 726, the execution of the VM is resumed on the host.

Referring to FIG. 7B, as described above, if there are insufficient resources, the method proceeds to FIG. 7B. In Step 726, the lowest priority active virtual wire operating in the blade chassis is obtained. In one embodiment of the invention, the control operating system maintains a data structure which includes the priorities of the various virtual wires operating in the blade chassis. Further, in one embodiment of the invention, only the control operating system includes functionality to set and change the priorities of the virtual wires.

In Step 728, the lowest priority active virtual wire is suspended. In one embodiment of the invention, suspending the lowest priority active virtual wire includes suspending operation of the VNICs on either end of the virtual wire. In addition, the VMs associated with the VNICs may also be suspended. Further, suspending the VNICs and, optionally, the VMs, results in freeing bandwidth and computing resources on the respective blades on which the suspended VNICs and VMs were executed.

In Step 730, the control operating system sends a request including the migration criteria to hosts executing on blades in the blade chassis. In one embodiment of the invention, the control operating system uses a multicast message to send the request. In Step 732, the control operating system receives responses from the hosts. The responses may include: (i) a response indicating that the host which sent the response is unable to satisfy the migration criteria or (ii) a response indicating that the host which sent the response is able to satisfy the migration criteria.

In Step 734, a determination is made, using the responses received in Step 732, about whether there are sufficient resources available to migrate the VM. If there are insufficient resources, the method proceeds to Step 726. Alternatively, if there are sufficient resources, the method proceeds to Step 710 in FIG. 7A.

In one embodiment of the invention, if one or more virtual wires are suspended per Step 728, then the method described in FIGS. 7A and 7B may be used to migrate the VMs associated with the suspended virtual wires. In one embodiment of the invention, the order in which VMs are migrated to resume activity of suspended virtual wires is based on the priority of the suspended virtual wires.

In one or more embodiments of the invention, a virtual machine may be migrated from a source blade on a source blade chassis to a target blade on a target blade chassis. Prior to migration, a virtual machine on the source blade may be in communication with a second virtual machine on the target blade. The communication may be through a physical router. The physical router is a physical device that connects the subnet of the first virtual machine with the subnet of the second virtual machine.

Figure 8:
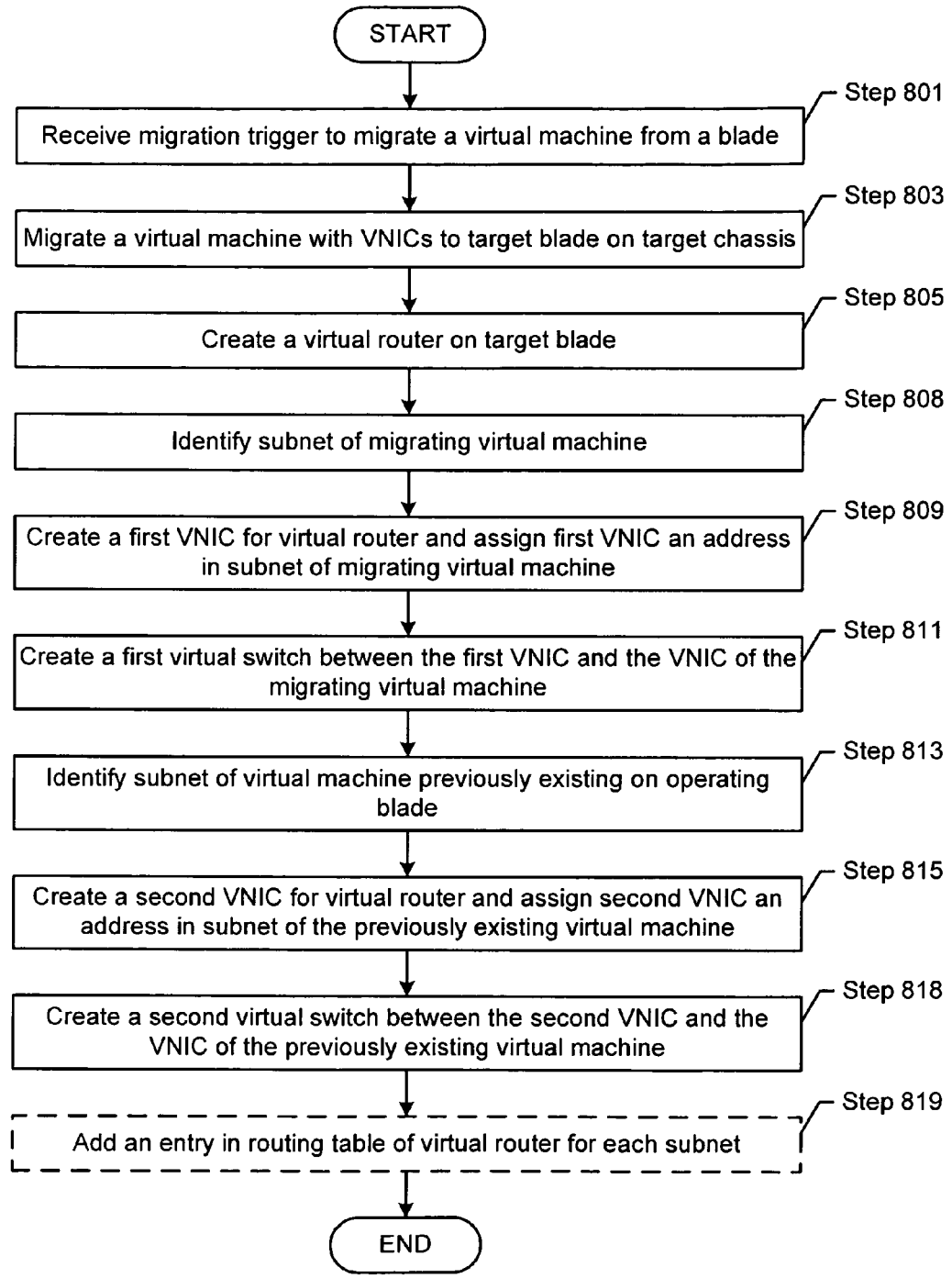
FIG. 8 shows a flowchart of a method for migrating virtual machines from one subnet to another subnet in accordance with one or more embodiments of the invention.

FIG. 8 shows a flowchart of a method for migrating virtual machines from one blade chassis to another blade chassis in accordance with one or more embodiments of the invention. In one or more embodiments of the invention, one or more of the steps shown in FIG. 8 may be omitted, repeated, and/or performed in a different order. Accordingly, embodiments of the invention should not be considered limited to the specific arrangement of steps shown in FIG. 8.

Initially, a migration trigger is received in Step 801. The migration trigger may be generated by any of the factors discussed above. The migration trigger may be received from a control operating system on the source blade chassis, monitoring system for multiple blade chassis, or any other physical or virtual device.

In response to the migration trigger, a virtual machine with VNICs are migrated from the source blade and source blade chassis to the target blade on the target blade chassis in Step 803. Performing the migration on the target blade may be performed as discussed above. Specifically, the control operating system may identify the target blade based on the migration criteria of the migrating virtual machine. The migration criteria may be obtained from the migrating virtual machine, from the control operating system on the source blade, from a centralized data repository, or other such source of data.

In Step 805, a virtual router is created on the target blade. Because the migrating virtual machine has an IP address on a different IP subnet than the virtual machines on the target blade chassis, a virtual router to route the packets between the two IP networks is created to maintain connectivity between the migration virtual machines and the virtual machines on the target blade chassis. Thus, the code for the virtual router is instantiated on the target blade. The subnet for the migrating virtual machine is identified in Step 807. In Step 809, a first VNIC is created for the virtual router and assigned an address in the subnet of the migrating virtual machine. Because the first VNIC is assigned an address in the subnet of the migrating virtual machine, the VNIC of the virtual router may communicate with the VNIC of the migrating virtual machine without altering the configuration of the VNIC of the migrating virtual machine.

In one or more embodiments of the invention, a virtual switch is created between the first VNIC and the VNIC of the migrating virtual machine. (Step 811). As discussed above the virtual switch may be used to route the network traffic between the first VNIC and the second VNIC independent of the blade or blade chassis of the VNICs.

In one or more embodiments of the invention, a virtual machine that is located on the source blade prior to the migration and communicates with the migrating virtual machine is identified. For the purposes of the description, the identified virtual machine may be referred to as a previously existing virtual machine. In Step 813, the subnet of the previously existing virtual machine is identified. A second VNIC is created and assigned an address in the subnet of the previously existing virtual machine in Step 815. Because the second VNIC is assigned the address of the subnet of the previously existing virtual machine, the previously existing virtual machine may communicate with the virtual router using the second VNIC without altering the configuration of the second VNIC. In one or more embodiments of the invention, a virtual switch is created between the second VNIC and the VNIC of the previously existing virtual machine in step 817.

In Step 819, an entry in the routing table of the virtual router is added for each subnet. Using the routing table, communication may be routed from the subnet of the migrating virtual machine to the subnet of the previously existing virtual machine. In alternative embodiments, a routing protocol, such as Routing Information Protocol (RIP), Open Shortest Path First (OSPF), or any other routing protocol known in the art, may be used to route packets between the two subnets using the virtual router and virtual switches.

Using the virtual switches and the virtual router, a packet may be routed between the migrating virtual machine and the existing virtual machine. For example, the packet may be transmitted on a first subnet from the migrating virtual machine, to the VNIC of the migrating virtual machine, to the first virtual switch, to the VNIC associated with the virtual router, to the virtual router. The packet may then be transmitted on a second subnet from the virtual router to another VNIC associated with the virtual router, to the second virtual switch, to the VNIC associated with the previously existing virtual machine, to the previously existing virtual machine. As shown by below, neither the VNICs of the virtual machines nor the virtual machines need to be reconfigured to communicate after the migration. Rather, each virtual machine may remain on the same subnet as prior to the migration in accordance with one or more embodiments of the invention.

Also, although not discussed above, when a newly migrating virtual machine is migrated to the target blade and the newly migrating virtual machine communicates with the previously existing virtual machine, the subnet of the newly migrating virtual machine is identified. If the subnet of the newly migrating is the same as the subnet of a previously migrated virtual machine, then the VNIC of the newly migrating virtual machine is connected to the same virtual switch as the previously migrated virtual machine. In such a scenario, another virtual router or virtual switch does not need to be created.

Alternatively, if the determination is made that the subnet of the newly migrating virtual machine is not the same as the subnet of the previously existing virtual machine, then a new VNIC is created for the virtual router and assigned a network address in the subnet of the newly migrating virtual machine. Further, a new virtual switch is created between the new VNIC and the VNIC of the newly migrating virtual machine. After, an entry in the routing table of the virtual router is added for the subnet of the newly migrating virtual machine (or a routing protocol, such as Routing Information Protocol (RIP), Open Shortest Path First (OSPF), etc. is enabled), the newly migrating virtual machine can communicate with the previously existing virtual machine.

Figure 9A:
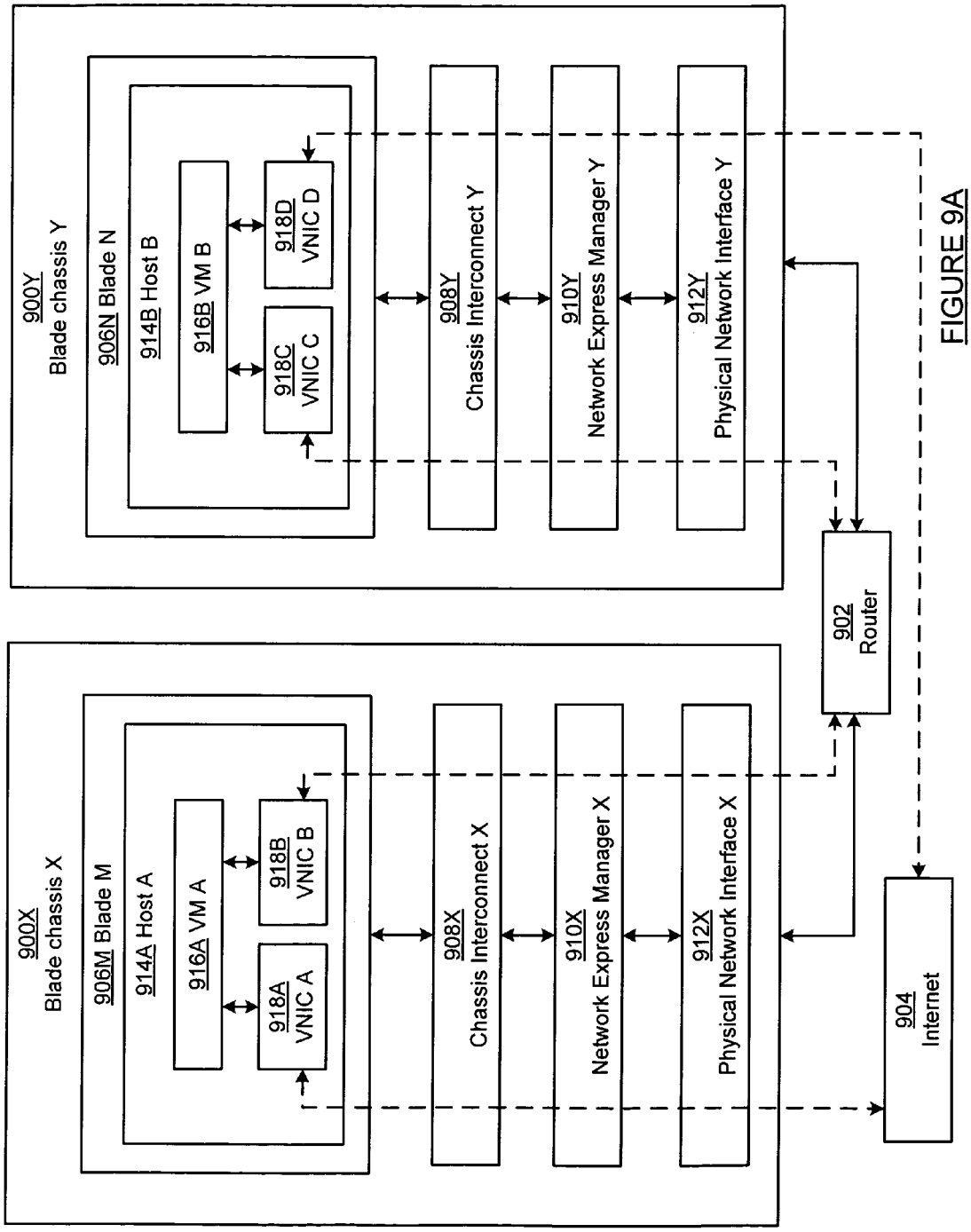
FIGS. 9A-9B show an example in accordance with one or more embodiments of the invention.
Figure 9B:
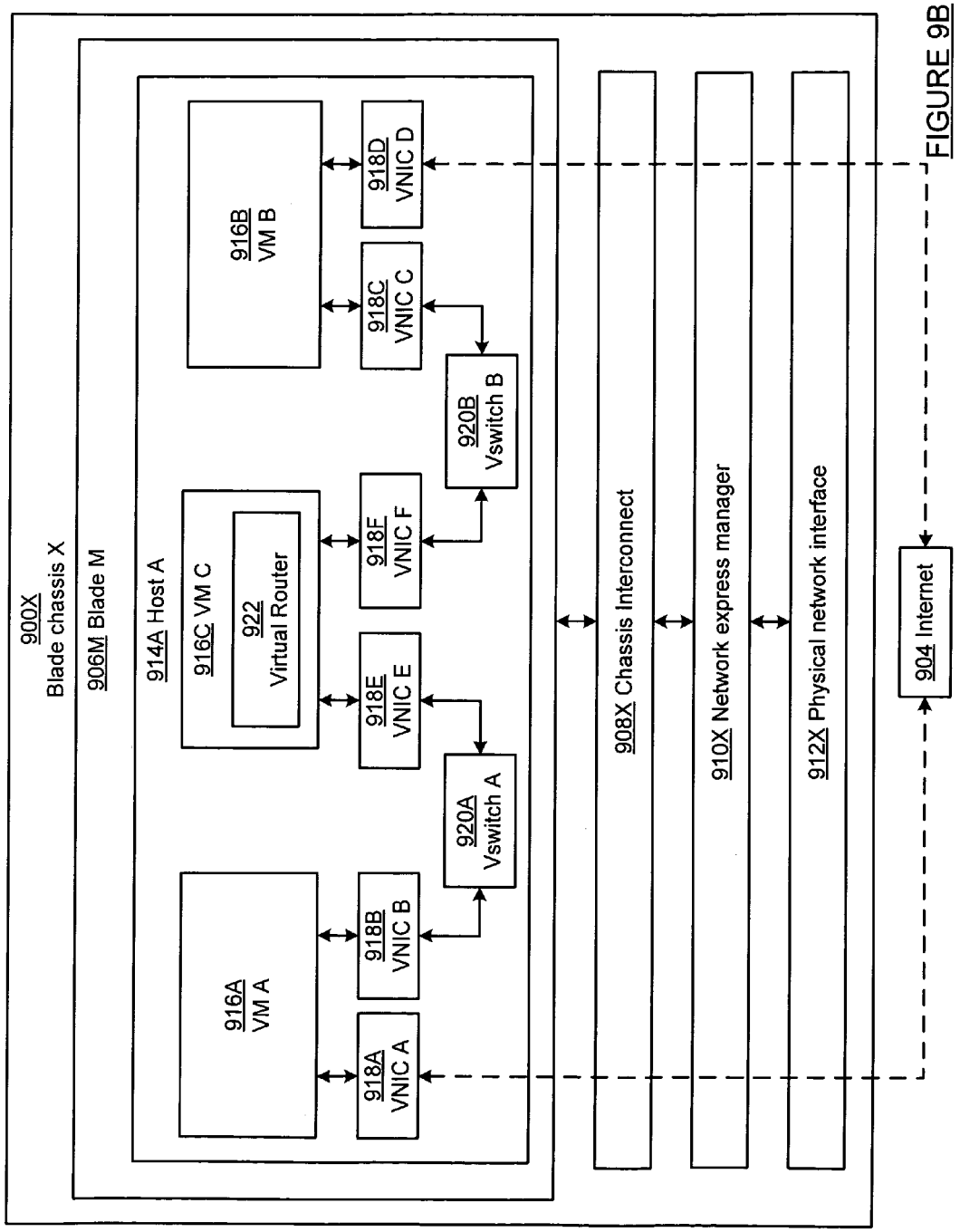

FIGS. 9A-9B show an example of scaling applications in accordance with one or more embodiments of the invention. FIGS. 9A-9B are provided as examples only, and should not be construed as limiting the scope of the invention.

In the following example shown in FIG. 9A, consider the scenario in which two blade chassis (e.g., blade chassis X, blade chassis Y (900Y)) exist. Blade chassis X (900X) includes blade M (906M), chassis interconnect X (908X), a network express manager (910X), and a physical network interface (912X). Similarly, blade chassis Y (900Y) includes blade N (906N), chassis interconnect Y (908Y), a network express manager (910Y), and a physical network interface (912Y).

Host A (914A) executes on Blade M (906M) and host B (914B) executes on blade N (906N). A virtual machine (e.g., VM A (916A), VM B (916B)) executes in each host (e.g., host A (914A), host B (914B)). VM A (916A) is connected to the subnet having addresses "18.55.45.x", while VM B (916B) is connected to the subnet having addresses "18.55.78.x". Because VM A (914A) is in a different subnet than VM B (914B), VM A (914A) and VM B (914B) communicate through a router (902) or the Internet (904). Specifically, VNIC A (918A) may be used by VM A (916A) to communicate via the Internet (904). VNIC B (918B) may be used by VM A (916A) to communicate via the router (902). Similarly, VNIC D (918D) may be used by VM B (916B) to communicate via the Internet (904). VNIC C (918C) may be used by VM B (916B) to communicate via the router (902).

In the example consider the scenario in which VNIC B (918B) is assigned the IP address "18.55.45.1" and VNIC C (918C) is assigned the IP address "18.55.78.2". Thus, when VM A (916A) sends a packet to VM B (916B), VM A (916A) may set the destination address of the packet as "18.55.78.2". The physical router (902) receives the packet and routes the packet to the subnet of VM B (916B).

Consider the scenario in which VM B (916B) is migrated to Host A (914A) on blade M (906M) of blade chassis X (900X). FIG. 9B shows a configuration after the migration is complete. As shown in FIG. 9B, a new virtual machine (e.g., VM C (916C)) is created. A virtual router (922) is executed in VM C (916C). The virtual router is able to route packets between the two subnets. The virtual router (922) has a VNIC for each subnet.

Specifically, VNIC E (918E) is assigned a network address in the same subnet as VNIC B (918B). Similarly, VNIC F (918F) is assigned a network address in the same subnet as VNIC B (918C). For example, VNIC E (918E) may be assigned the network address of "18.55.45.2" and VNIC F (918F) may be assigned the network address of "18.55.78.1". Further, Vswitch A (920A) connects VNIC B (918B) to VNIC E (918E). Vswitch B (920B) connects VNIC F (918B) to VNIC C (918E).

Consider the scenario in which VM A (916A) transmits a packet to VM B (916B). Thus, VM A (916A) may set the destination address of the packet to "18.55.78.2". The packet is sent to VNIC B (918B) which sends the packet to Vswitch A (920A). Vswitch A (920A) sends the packet to VNIC E (918E) which sends the packet to the virtual router (922). The virtual router (922) sends the packet to the correct subnet using VNIC F (918F). VNIC F (918F) sends the packet through Vswitch B (920B) to VNIC C (918C). At this stage, VM B (916B) obtains the packet from VNIC C (918C).

Because VNIC E (918E) is assigned a network address in the same subnet as VNIC B (918B), and VNIC F (918F) is assigned a network address in the same subnet as VNIC C (918C), VM A (916A) can continue to communicate with VM B (916B) without reconfiguring VM A (916A), VM B (916B), VNIC B (918B), or VNIC C (918C).

Those skilled in the art will appreciate that while the invention has been described with respect to using blades, the invention may be extended for use with other computer systems, which are not blades. Specifically, the invention may be extended to any computer, which includes at least memory, a processor, and a mechanism to physically connect to and communicate over the chassis bus. Examples of such computers include, but are not limited to, multi-processor servers, network appliances, and light-weight computing devices (e.g., computers that only include memory, a processor, a mechanism to physically connect to and communicate over the chassis bus), and the necessary hardware to enable the aforementioned components to interact.

Further, those skilled in the art will appreciate that if one or more computers, which are not blades, are not used to implement the invention, then an appropriate chassis may be used in place of the blade chassis.

Software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for migrating a first virtual machine (VM), comprising:
    transmitting, prior to migration, a first packet between the first VM and a second VM using a first virtual network interface card (VNIC) and a second VNIC, wherein the first VM executes on a first blade in a first blade chassis prior to migration, wherein the second VM executes on a second blade in a second blade chassis, and wherein the first VNIC is associated with the first VM and the second VNIC is associated with the second VM;
    migrating the first VM and the first VNIC to the second blade;
    identifying a subnet of the first VM;
    identifying a subnet of the second VM, wherein the subnet of the second VM is different from the subnet of the first VM;
    creating a virtual router to execute on the second blade, wherein the virtual router is associated with a third VNIC and a fourth VNIC, wherein a first network address in the subnet of the first VM is assigned to the third VNIC, wherein a second network address in the subnet of the second VM is assigned to the fourth VNIC;
    creating a first virtual switch to connect the first VNIC to the third VNIC;
    creating a second virtual switch to connect the second VNIC to the fourth VNIC; and
    routing a second packet between the first VM and the second VM using the virtual router after migration.

2. The method of claim 1, further comprising:
    transmitting a third packet between a third VM and the second VM using a fifth VNIC and the second VNIC, wherein the third VM executes on the first blade prior to migration, and wherein the fifth VNIC is associated with the third VM;
    migrating the third VM and the fifth VNIC to the second blade;
    identifying a subnet of the third VM;
    determining that the subnet of the third VM is the same as the subnet of the first VM;
    connecting the fifth VNIC to the first virtual switch based on the determination; and
    routing a fourth packet between the fifth VM and the second VM using the virtual router after migration.

3. The method of claim 1, further comprising:
    transmitting a third packet between the third VM and the second VM using a fifth VNIC and the second VNIC prior to migration, wherein the third VM executes on a third blade prior to migration, and wherein the fifth VNIC is associated with the third VM;
    migrating the third VM and the fifth VNIC to the second blade;
    identifying a subnet of the third VM;
    determining that the subnet of the third VM is different from the subnet of the first VM;
    creating a sixth VNIC for the virtual router, wherein a third network address in the subnet of the third VM is assigned to the sixth VNIC;
    creating a third virtual switch to connect the fifth VNIC to the sixth VNIC; and
    routing a fourth packet between the fifth VM and the second VM using the virtual router after migration.

4. The method of claim 1, wherein migrating the VM is based on a migration trigger, and wherein the migration trigger is based on power management.

5. The method of claim 1, wherein migrating the VM is based on a migration trigger, and wherein the migration trigger is failure of the first blade.

6. The method of claim 1, wherein the first virtual switch and the second virtual switch execute on the second blade.

7. The method of claim 1, wherein the second packet is routed only within the blade chassis.

8. A computer system for migrating a first virtual machine (VM), comprising:
    a processor;
    a memory; and
    software instructions stored in the memory for enabling the computer system to:

transmit, prior to migration, a first packet between the first VM and a second VM using a first virtual network interface card (VNIC) and a second VNIC, wherein the first VM executes on a first blade in a first blade chassis prior to migration, wherein the second VM executes on a second blade in a second blade chassis, and wherein the first VNIC is associated with the first VM and the second VNIC is associated with the second VM;

migrate the first VM and the first VNIC to the second blade;

identify a subnet of the first VM;

identify a subnet of the second VM, wherein the subnet of the second VM is different from the subnet of the first VM;

create a virtual router to execute on the second blade, wherein the virtual router is associated with a third VNIC and a fourth VNIC, wherein a first network address in the subnet of the first VM is assigned to the third VNIC, wherein a second network address in the subnet of the second VM is assigned to the fourth VNIC;

create a first virtual switch to connect the first VNIC to the third VNIC;

create a second virtual switch to connect the second VNIC to the fourth VNIC; and route a second packet between the first VM and the second VM using the virtual router after migration.

9. The computer system of claim 8, wherein the software instructions further cause the computer system to:

transmit a third packet between a third VM and the second VM using a fifth VNIC and the second VNIC, wherein the third VM executes on the first blade prior to migration, and wherein the fifth VNIC is associated with the third VM;

migrate the third VM and the fifth VNIC to the second blade;

identify a subnet of the third VM;

determine that the subnet of the third VM is the same as the subnet of the first VM;

connect the fifth VNIC to the first virtual switch based on the determination; and route a fourth packet between the fifth VM and the second VM using the virtual router after migration.

10. The computer system of claim 8, wherein the software instructions further cause the computer system to:

transmit a third packet between the third VM and the second VM using a fifth VNIC and the second VNIC prior to migration, wherein the third VM executes on a third blade prior to migration, and wherein the fifth VNIC is associated with the third VM;

migrate the third VM and the fifth VNIC to the second blade;

identify a subnet of the third VM;

determine that the subnet of the third VM is different from the subnet of the first VM;

create a sixth VNIC for the virtual router, wherein a third network address in the subnet of the third VM is assigned to the sixth VNIC;

create a third virtual switch to connect the fifth VNIC to the sixth VNIC; and route a fourth packet between the fifth VM and the second VM using the virtual router after migration.

11. The computer system of claim 8, wherein migrating the VM is based on a migration trigger, and wherein the migration trigger is based on power management.

12. The computer system of claim 8, wherein migrating the VM is based on a migration trigger, and wherein the migration trigger is failure of the first blade.

13. The computer system of claim 8, wherein the first virtual switch and the second virtual switch execute on the second blade.

14. The computer system of claim 8, wherein the second packet is routed only within the blade chassis.

15. A non-transitory computer readable medium comprising computer readable program code embodied therein for causing a computer system to:

transmit, prior to migration, a first packet between a first virtual machine (VM) and a second VM using a first virtual network interface card (VNIC) and a second VNIC, wherein the first VM executes on a first blade in a first blade chassis prior to migration, wherein the second VM executes on a second blade in a second blade chassis, and wherein the first VNIC is associated with the first VM and the second VNIC is associated with the second VM;

migrate the first VM and the first VNIC to the second blade;

identify a subnet of the first VM;

identify a subnet of the second VM, wherein the subnet of the second VM is different from the subnet of the first VM;

create a virtual router to execute on the second blade, wherein the virtual router is associated with a third VNIC and a fourth VNIC, wherein a first network address in the subnet of the first VM is assigned to the third VNIC, wherein a second network address in the subnet of the second VM is assigned to the fourth VNIC;

create a first virtual switch to connect the first VNIC to the third VNIC;

create a second virtual switch to connect the second VNIC to the fourth VNIC; and route a second packet between the first VM and the second VM using the virtual router after migration.

16. The computer readable medium of claim 15, wherein the computer readable program code further causes the computer system to:

transmit a third packet between a third VM and the second VM using a fifth VNIC and the second VNIC, wherein the third VM executes on the first blade prior to migration, and wherein the fifth VNIC is associated with the third VM;

migrate the third VM and the fifth VNIC to the second blade;

identify a subnet of the third VM;

determine that the subnet of the third VM is the same as the subnet of the first VM;

connect the fifth VNIC to the first virtual switch based on the determination; and route a fourth packet between the fifth VM and the second VM using the virtual router after migration.

17. The computer readable medium of claim 15, wherein the computer readable program code further causes the computer system to:

transmit a third packet between the third VM and the second VM using a fifth VNIC and the second VNIC prior to migration, wherein the third VM executes on a third blade prior to migration, and wherein the fifth VNIC is associated with the third VM;

migrate the third VM and the fifth VNIC to the second blade;

identify a subnet of the third VM;

determine that the subnet of the third VM is different from the subnet of the first VM;

create a sixth VNIC for the virtual router, wherein a third network address in the subnet of the third VM is assigned to the sixth VNIC;
create a third virtual switch to connect the fifth VNIC to the sixth VNIC; and
route a fourth packet between the fifth VM and the second VM using the virtual router after migration.

18. The computer readable medium of claim 15, wherein migrating the VM is based on a migration trigger, and wherein the migration trigger is based on power management.

19. The computer readable medium of claim 15, wherein migrating the VM is based on a migration trigger, and wherein the migration trigger is failure of the first blade.

20. The computer readable medium of claim 15, wherein the first virtual switch and the second virtual switch execute on the second blade, and wherein the second packet is routed only within the blade chassis.

* * * * *